US006830326B2

(12) United States Patent
Tsao et al.

(10) Patent No.: US 6,830,326 B2
(45) Date of Patent: Dec. 14, 2004

(54) ENHANCEMENT OF INK JET IMAGE WATERFASTNESS WITH OVERPRINTING

(75) Inventors: Yi-Hua Tsao, San Diego, CA (US); Howard A. Doumaux, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/279,605

(22) Filed: Oct. 23, 2002

(65) Prior Publication Data

US 2003/0092796 A1 May 15, 2003

Related U.S. Application Data

(62) Division of application No. 09/572,712, filed on May 16, 2000, now Pat. No. 6,503,978.

(51) Int. Cl.[7] .............................. B41J 2/01; B05D 3/10; B05D 1/36; C09D 11/02; C09D 5/00; C08L 33/02; C08L 81/00; C08L 85/02

(52) U.S. Cl. ...................... 347/98; 427/333; 427/407.1; 427/411; 524/556; 524/609; 524/610; 523/160; 106/31.6

(58) Field of Search ................... 347/98, 100; 427/333, 427/407.1, 411; 524/556, 609, 610; 523/160, 161; 106/31.6

(56) References Cited

U.S. PATENT DOCUMENTS

| | | | | | |
|---|---|---|---|---|---|
| 5,302,437 | A | | 4/1994 | Idei et al. | |
| 5,462,592 | A | | 10/1995 | Murakami et al. | |
| 5,536,306 | A | | 7/1996 | Johnson et al. | |
| 5,640,187 | A | | 6/1997 | Kashiwazaki et al. | |
| 5,679,143 | A | | 10/1997 | Looman | |
| 5,695,820 | A | | 12/1997 | Davis et al. | |
| 5,785,743 | A | | 7/1998 | Adamic et al. | |
| 5,792,249 | A | | 8/1998 | Shirota et al. | |
| 6,027,210 | A | | 2/2000 | Kurabayashi et al. | |
| 6,238,047 | B1 | | 5/2001 | Suzuki et al. | |
| 6,254,217 | B1 | * | 7/2001 | Askeland et al. | 347/43 |
| 6,412,935 | B1 | * | 7/2002 | Doumaux | 347/99 |
| 6,419,352 | B1 | * | 7/2002 | Kubota et al. | 347/96 |
| 6,460,989 | B1 | * | 10/2002 | Yano et al. | 347/101 |

FOREIGN PATENT DOCUMENTS

| | | |
|---|---|---|
| EP | 0587164 | 3/1995 |
| JP | 1009279 | 1/1989 |
| JP | 01063185 | 3/1989 |
| JP | 11349873 | 12/1999 |
| WO | WO 99/64249 | 12/1999 |

* cited by examiner

*Primary Examiner*—Callie Shosho

(57) ABSTRACT

In a four pen ink jet printer comprising cyan, yellow, magenta, and black inks, a clear liquid is applied to printed ink on a print medium via a fifth pen, thereby fixing the colorants, which in turn improves the durability of the printed ink. The clear fixer fluid comprises at least one organic acid and, optionally, a salt of at least one polymeric acid.

12 Claims, 1 Drawing Sheet

ENHANCEMENT OF INK JET IMAGE WATERFASTNESS WITH OVERPRINTING

CROSS REFERENCE To RELATED APPLICATION(S)

The present application is a divisional application of application Ser. No. 09/572,712, filed on May 14, 2000, now U.S. Pat. No. 6,503,978, issued on Jan. 7, 2003, incorporated herein by reference. The present application is related to application Ser. No. 09/572,714, also filed on May 16, 2000, now U.S. Pat. No. 6,412,935, issued on Jul. 2, 2002, incorporated herein by reference. The present application is directed to the composition of a fixer fluid used in over-printing, while the related application is directed to the mechanics of over-printing the fixer fluid.

TECHNICAL FIELD

The present invention is related generally to ink jet printing and, more particularly, to improving the waterfastness of the printed ink.

BACKGROUND ART

Ink jet color printers commonly have four separate color pens, or cartridges: cyan, yellow, magenta, and black, for providing a full gamut of colors and hues. Such ink jet color printers are commonly called "four pen" printers.

Porous media has been shown to give instant dry time printing with an ink jet printer. However, print quality, as evidenced by waterfastness, for example, may be compromised by improving other qualities, such as dry time.

With an increased demand for outdoor signage and window displays, efforts have been made to increase the durability of ink jet print by printing pH-sensitive pigmented inks on porous media provided with a coating. The coating typically comprises a bottom coating of silica and a top coating of alumina; see, e.g., U.S. patent application Ser. No. 09/491,642, filed Jan. 27, 2000. Adjusting the pH in the coating helps to immobilize the pH-sensitive pigmented inks, resulting in better waterfastness. However, adjusting the pH in the coating is sometimes not desirable, due to flocculation of the inorganic filler used in the coating fluid at desired pH or image quality (IQ) tradeoff due to flocculation of the pH-sensitive pigmented ink. Also, for media which are not designed to work with certain ink sets, durability is impossible to be achieved without post processing, e.g., lamination.

Thus, there is a need for improved waterfastness on printed porous media without the need for post processing.

DISCLOSURE OF INVENTION

In accordance with the present invention, a clear liquid is applied to the print via a fifth pen, thereby fixing the colorants, which in turn improves the durability of the printed ink. The clear fixer fluid comprises at least one organic acid and, optionally, a salt of at least one polymeric acid.

Also in accordance with the invention, a method is provided for fixing a printed ink printed by an ink jet printer, the printed ink comprising an ink composition that would precipitate or flocculate at a pH of about 6 or less. The method comprises:

(a) printing at least one ink on a print medium, the ink(s) containing a pigment to form a pigment-based ink; and (b) overprinting the ink with the clear fixer fluid.

The clear fixer fluid enhances the wet rub durability, smearfastness, and waterfastness of pigmented ink printed on porous and/or semi-porous alumina- or silica-coated print media.

BEST MODES FOR CARRYING OUT THE INVENTION

The wet rub durability, smearfastness, and waterfastness of pigmented inks printed on porous and/or semi-porous alumina- or silica-coated media (also called porous or semi-porous media) may be enhanced by lamination, which can be costly and prone to operator error. A more desirable procedure would be to have the printer apply the overcoat fixer fluid during the printing process.

Dry-time is enhanced by using porous coatings containing alumina or silica. Capillary force draws the fluid into the porous matrix and fills the pores much faster than relying on polymer swelling in other conventional, non-porous coatings. Depending on pore volumes existing in the porous coating, sometimes underprinting is less desirable because the fixer fluid may fill the pores, resulting in ink flooding, or excess ink flowing on the surface of the print medium, when ink is printed.

The alumina and silica-based coatings noted above are substantially transparent and should not adversely impact the hue, chroma, or optical density of the inks. The transparent nature of these coatings differentiates them from "plain paper" media, where penetration of the inks into these media substantially reduces their chroma and optical density. By using an underprinted fixer fluid, it is possible to raise the chroma and optical density of pigmented inks on plain paper. However, it is expected to be desirable to overprint the fixer fluid rather than underprinting (or some combination of over- and underprinting) the fixer fluid when silica- or alumina-coated media are used. Application of the fixer fluid prior to or during ink application may also result in undesirable area fill nonuniformity due to immediate flocculation of the color pigment.

Silica- and alumina-coated media have been shown to require multi-pass printing in order to deliver high image quality (IQ) and reasonable throughput. In a multi-pass printmode, only the terminal $1/N_{pass}$ nozzles of the fixer pen would operate the terminal nozzles, where $N_{pass}$ is the number of passes in the printmode. A substantial portion of the pen nozzles would not be utilized, exerting undue load on the nozzles in use. In a printer primarily devoted to plain paper printing, this type of print mode may be acceptable, as a small portion of the printer's life would be spent print on porous/semi-porous media. However, large-format or specialty printers under consideration are generally designed to print on porous/semi-porous media for the majority of their life. Therefore, it is desirable to spread the duty cycle over the entire printhead to enhance printhead life.

Figure 1:
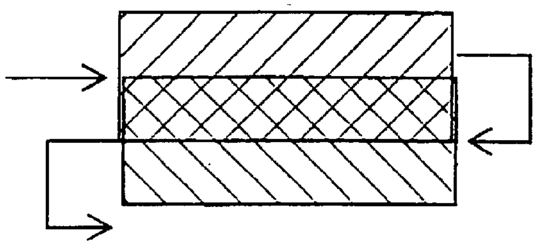
FIG. 1 is a schematic representation depicting a conventional two-pass print mode comprising printing a swath on a print medium and advancing the print medium by one-half swath height and printing the remainder of the top portion of the swath and the first half of the lower swath.

One way of doing this is to utilize a variant on a printmode developed within Hewlett-Packard Company for eliminating hue shifts caused by bi-directional printing on plain paper; see, e.g., U.S. patent application Ser. No. 09/363,943, filed Jul. 29, 1999, now U.S. Pat. No. 6,254,217. This printmode works by printing a first printing a swath, and then advancing the paper a small number of dot rows to help reduce banding due to mis-directed or missing nozzles (for a two-pass printmode, the prior art practice is to advance the paper one-half of the swath height, as shown in FIG. 1). The return swath then covers nearly the same portion of the paper. This printmode thus forces the hue shift into a few dot rows per swath.

Figure 2:
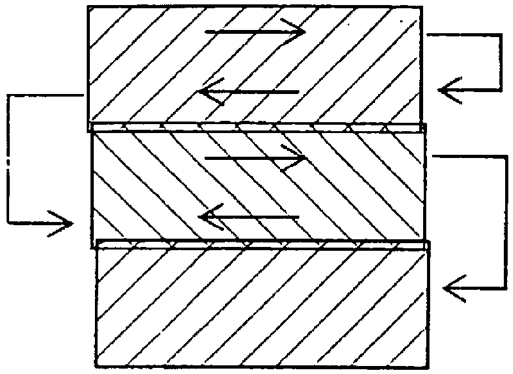
FIG. 2 is a view similar to that of FIG. 1, but depicting a modified print mode comprising printing a swath on a print medium and advancing the print medium a few dot rows, printing the remainder of the top portion of the swath and the first portion of the lower swath, then advancing the print medium nearly a full swath.
Figure 3:
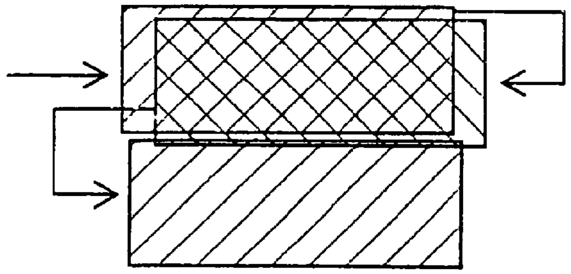
FIG. 3 is a view similar to that of FIG. 2, but depicting the combination of the modified print mode with also overprinting a fixer.

A similar method may also be used to apply the fixer fluid overcoat. The image is still printed in a series of swaths, but instead of performing a $N_{nozzles}/N_{pass}$ dot row advance, the media is not advanced or is only advanced a few dot rows per pass; $N_{nozzles}$ is the number of nozzles in use on the printhead and $N_{pass}$ is the number of passes in the printmode. On the Nth pass, the fixer fluid is applied if the fixer fluid pen is trailing the printing pens. If the fixer fluid pen is leading on this swath, an additional swath is printed without a media advance. Only the fixer fluid pen prints on this pass. The media is then advanced the fall swath height of the pen minus the cumulative number of dot rows advanced in the printing process (see FIG. 2). If an odd number of passes are used, this method may require an additional swath per section of media printed. If two overcoat fixer fluid pens are used, no additional swaths are required (it is presumed that the fixer fluid pen(s) resides at the one (or both) ends of the pen cartridge). An additional refinement of this technique is to position the fixer fluid pen slightly behind the other pens so that it can overprint the dots advanced out of the normal print zone during the printing process and to prevent migration of the fixer fluid into the region being printed (see FIG. 3).

Figure 4:
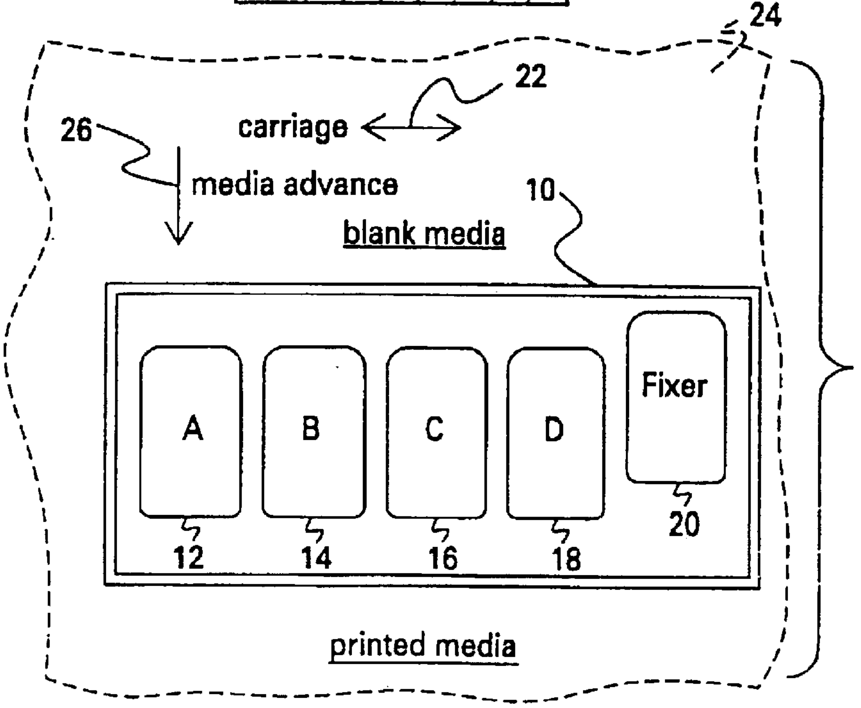
FIG. 4 is a top plan view depicting a five pen carriage design, combining four color pens and a fixer pen.

As shown in FIG. 4, the carriage 10 of a printer thus comprises four pens 12, 14, 16, and 18, each containing one of the colors cyan, yellow, magenta, and black. A fifth pen 20 contains the fixer fluid. The motion of the carriage is bi-directional across the paper, as indicated by arrow 22, while the print medium (e.g., paper) 24 advances along the paper, as indicated by arrow 26.

Although a bi-directional example is described above, uni-directional printing is also an optional way of employing this technique.

The fixer fluid contained in the fifth pen 20 comprises at least one organic acid and, optionally, at least one salt of a polymeric acid. Examples of organic acids that may be suitably employed in the practice of the invention include, but are not limited to, mono-, di-, and polyfunctional organic acids. In general, it is contemplated that any water-soluble organic acid having a pKa equal to or less than that of the pH-sensitive colorant of concern may be suitably employed. Preferably, one of the following classes of organic acids is employed: acetic, glycolic, malonic, malic, maleic, ascorbic, succinic, glutaric, fumaric, citric, tartaric, lactic, sulfonic, and ortho-phosphoric acid and derivatives thereof. Examples of polymeric acids include polyacrylic acid, polyvinyl phosphonic acid and other polymers with phosphate groups (R—$PO_3$ or R—O—$PO_3$), polystyrene sulfonic acid, and polymers containing sulfonate and carboxylate groups. The cation associated with the polymeric acid may comprise sodium, ammonium, or potassium. The polymeric acid salt acts as a buffer.

The fixer fluid has a pH in the range of about 2 to 5. A pH less than about 2 is too corrosive for the ink jet print cartridge components, while a pH greater about 5 adversely affects the ability of the fixer to destabilize the pigment dispersion, "fixing" the pigment to the page.

The total concentration of organic acid and polymeric acid salt is within the range of about 1 to 15 wt % of the fixer fluid.

Preferably, succinic acid is employed as the organic acid, in a concentration within the range of about 2 to 7 wt % of the fixer, preferably at a pH of about 4, as adjusted with a base, such as sodium hydroxide or β-alanine. The sodium salt of poly-acrylic acid (mw=2,000 or mw=20,000) having a concentration within the range of about 1 to 10 wt % of the fixer may additionally be employed in the practice of the present invention.

Other preferred organic acids include citric acid and glycolic acid. Preferred polymeric acids include polyvinyl phosphonic acid and polystyrene sulfonic acid.

The fluid fixer also includes co-solvents commonly employed in the inks, such as 1,5-pentanediol, 2-pyrrolidone, and 2-ethyl-2-(hydroxymethyl)-1,3-propanediol. Other co-solvents may also be used, along with additional components often found in ink jet inks, such as surfactants, biocides, and the like, for controlling printability and reliability in ink jet printing.

Other components commonly added to ink-jet inks, such as solvents, penetrants, biocides, and the like, may also be added to the fixer solution of the present invention for improving pen performance and reliability. Such other components may include ammonium nitrate, EHPD (2-ethyl-2-(hydroxymethyl)-1,3-propanediol), 1,5-pentanediol, and/or 2-pyrrolidone.

EXAMPLES

Pens containing acid and the polymeric acid or salt form were filled (Table I). Magenta solid fill area was printed on a porous media on an H-P 2500CP printer. Similar to what is disclosed in above-referenced application Ser. No. 09/491,642, the porous media had a two-layer structure. The top layer (coated at 20 $g/m^2$) contained 89 wt % alumina boehmite and 11 wt % binder, such as polyvinyl alcohol. The base layer (coated at 25 $g/m^2$) contained 78 wt % silica and 22 wt % binder, such as polyvinyl alcohol.

The magenta pen was then taken out and replaced by the test pen. The same print file was used to print the clear fixer fluid on the magenta-printed sheet, except the sheet was fed backward. The print file was designed such that part of the magenta ink-covered area was overprinted with the clear fixer fluid.

TABLE I

Formulations of the Clear Fixer Fluid.

| Ink Ingredient | Percent | Grams |
| --- | --- | --- |
| A. Acidic Fixing Fluid | | |
| 1,5-pentanediol | 8 | 40.00 |
| 2-pyrrolidinone | 7.5 | 37.50 |
| EHPD | 7.5 | 37.50 |
| Dowfax 8390 | 1 | 5.00 |
| Tergitol 15-S-5 | 0.5 | 7.50 |
| ammonium nitrate | 0.5 | 2.50 |
| succinic acid | 7 | 35.00 |
| DI Water | | 335.00 |
| Total | | 500.00 |
| Adjust to pH 4 with beta-alanine | | |
| B. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| succinic acid | 7 | 35.00 |
| DI Water | | 347.50 |
| Total | | 500.00 |
| Adjust to pH 4 with beta-alanine | | |
| C. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| succinic acid | 7 | 35.00 |
| DI Water | | 347.50 |
| Total | | 500.00 |
| D. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| glycolic acid | 7 | 35.00 |
| DI Water | | 347.50 |
| Total | | 500.00 |
| E. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| citric acid | 7 | 35.00 |
| DI Water | | 347.50 |
| Total | | 500.00 |
| F. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| succinic acid | 7 | 35.00 |
| Na PAA 2000 | 3 | 15.00 |
| DI Water | | 347.50 |
| Total | | 515.00 |
| Adjust to pH 4 with beta-alanine | | |
| G. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| succinic acid | 4 | 20.00 |
| Na PAA 2000 | 3 | 15.00 |
| DI Water | | 362.50 |

TABLE I-continued

Formulations of the Clear Fixer Fluid.

| Ink Ingredient | Percent | Grams |
| --- | --- | --- |
| Total | | 515.00 |
| Adjust to pH 4 with beta-alanine | | |
| H. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| succinic acid | 7 | 35.00 |
| Na PAA 20,000 | 3 | 15.00 |
| DI Water | | 347.50 |
| Total | | 515.00 |
| Adjust to pH 4 with beta-alanine | | |
| I. Acidic Fixer Fluid | | |
| 1,5-pentanediol | 8 | 40.00 |
| 2-pyrrolidinone | 7.5 | 37.50 |
| EHPD | 7.5 | 37.50 |
| ammonium nitrate | 0.5 | 2.50 |
| succinic acid | 4 | 20.00 |
| Na PAA 20,000 | 3 | 15.00 |
| DI Water | | 362.50 |
| Total | | 515.00 |
| Adjust to pH 4 with beta-alanine | | |

Note:
EHPD = 2-ethyl-2-(hydroxymethyl)-1,3-propanediol
DI water = de-ionized water
Na PAA = sodium salt of polyacrylic acid A wet rubbing test and a water drip test were performed on all samples to see how much colorant was transferred. The wet rubbing test was based on the TAPPI (Technical Association of the Pulp and Paper Industry) 830PM-92 method (ink rub test of containerboard). The water drip test comprised setting a printed sample at 45° and dripping water over the ink. Visual observation is sufficient to determine if colorant is transferred across the sheet by the water.

In all cases, the overprinted areas, that is, areas overprinted with fixer, showed better wet rub fastness and wet drip fastness than areas that were only covered with magenta ink.

The pH of fixers C–E were not adjusted with alkali, and the pH of these fixers ranged from 2 to 2.5.

Fixer A failed the water dip test, due to the presence of the surfactants, but was better than no fixer at all. From this result, it is clear that little or no surfactant should be used in the fixer compositions of the present invention. Examples of surfactants to be avoided, to the extent possible, include the Tergitols, the Surfynols, and other surfactants with HLB values in the range of 6 to 25.

Comparing the succinic acid-containing fixers above (B, F, G, H, I), ranking of the pens used in increasing the water rub fastness of the porous media is as follows (from most to least effective):

H>B>I>F>G.

However, even the least effective formulation still gave significantly better waterfastness than samples without overprinting.

The presence of succinic acid and/or higher molecular weight (20,000) polymer of sodium polyacrylic acid (NaPAA) appears to help water rub fastness. With regard to fixers C, D, and E, these were not printed with the fixer fluid; rather, the fixer fluid was simply poured over the printed medium and then rubbed. Very minimal or no pigment transfer was observed for these three fixers, compared to not pouring and then rubbing, which resulted in rubbing off (80–90%) of the printed image.

INDUSTRIAL APPLICABILITY

The fixer fluid composition is expected to find use in ink jet printing for increasing waterfastness of inks printed on media.

What is claimed is:

1. A method of fixing a printed ink printed by an ink jet printer, said printed ink comprising an ink composition that would precipitate or flocculate at a pH of about 6 or less, said method comprising:

(a) printing at least one ink on a print medium, said at least one ink "having a colorant consisting essentially of at least one" pigment to form a pigment-based ink, said print medium being selected from the group consisting of porous and semi-porous having a coating thereon selected from the group consisting of alumina and silica; and (b) overprinting said ink with a clear fixer fluid comprising a fixing component consisting essentially of at least one organic acid and, optionally, a salt of at least one polymeric acid.

2. The method of claim 1 wherein said organic acid is selected from the group consisting of mono-functional, di-functional, and poly-functional organic acids.

3. The method of claim 2 wherein said organic acid is present in said fixer fluid in a concentration within a range of about 1 to 15 wt %.

4. The method of claim 3 wherein said organic acid is present in said fixer fluid in a concentration within a range of about 2 to 7 wt %.

5. The method of claim 2 wherein said organic acid is selected from the group consisting of acetic, glycolic, malonic, malic, maleic, ascorbic, succinic, glutaric, fumaric, citric, tartaric, lactic, sulfonic, and ortho-phosphoric acid and derivatives thereof.

6. The method of claim 5 wherein said organic acid is selected from the group consisting of succinic acid, citric acid, and glycolic acid.

7. The method of claim 1 wherein said polymeric acid is selected from the group consisting of polyvinyl phosphonic acid, polymers with phosphate groups, polystyrene sulfonic acid, and polymers containing sulfonate or carboxylate groups.

8. The method of claim 7 wherein said salt comprises a cation associated with said polymeric acid and wherein said cation is selected from the group consisting of sodium, ammonium, and potassium.

9. The method of claim 1 wherein polymeric acid is present in said fixer fluid in a concentration within a range of about 1 to 10 wt %.

10. The method of claim 1 wherein said fixer has a pH within a range of about 2to 5.

11. The method of claim 1 wherein said ink jet printer includes four pens, each containing an ink, at least one of said inks containing said pigment and a fifth pen containing said clear fixer fluid.

12. The method of claim 11 wherein said overprinting is performed by over-printing said at least one pigment-based ink with said fixer fluid by advancing said print medium a few dot rows per print swath and either (i) applying said fixer fluid to said at least one pigment-based ink on an $N^{th}$ pass where said fixer fluid pen trails said at least one ink-printing pen, or (ii) printing an additional swath without an advance of said print medium with said fixer fluid where said fixer fluid pen leads said at least one ink-printing pen.

* * * * *

UNITED STATES PATENT AND TRADEMARK OFFICE

CERTIFICATE OF CORRECTION

PATENT NO. : 6,830,326 B2
DATED : December 14, 2004
INVENTOR(S) : Tsao et al.

It is certified that error appears in the above-identified patent and that said Letters Patent is hereby corrected as shown below:

Column 7,
Line 16, delete “having” and insert therefor -- having --.
Line 17, delete “one” ” and insert therefor -- one --.

Column 8,
Line 20, delete “2to” and insert therefor -- 2 to --.

Signed and Sealed this

Nineteenth Day of July, 2005

JON W. DUDAS
*Director of the United States Patent and Trademark Office*